United States Patent
Faranda et al.

[11] Patent Number: 6,097,593
[45] Date of Patent: Aug. 1, 2000

[54] SEMI-MOBILE DESKTOP PERSONAL COMPUTER

[75] Inventors: Robert T. Faranda, Boxborough; Bradford G. Chapin, Ayer, both of Mass.

[73] Assignee: Digital Equipment Corporation, Maynard, Mass.

[21] Appl. No.: 09/133,874

[22] Filed: Aug. 14, 1998

[51] Int. Cl.[7] .................................................. G06F 1/16
[52] U.S. Cl. ........................ 361/685; 361/683; 361/725
[58] Field of Search .................. 361/683, 685, 361/724, 725, 727; 312/223.2; 364/708.1

[56] References Cited

U.S. PATENT DOCUMENTS

| | | | |
|---|---|---|---|
| 5,157,585 | 10/1992 | Myers | 361/724 |
| 5,175,672 | 12/1992 | Conner et al. | 364/708.1 |
| 5,646,818 | 7/1997 | Hahn | 361/681 |
| 5,768,163 | 6/1998 | Smith, II | 364/708.1 |
| 5,822,181 | 10/1998 | Jung | 361/683 |
| 5,867,148 | 2/1999 | Kamimaki et al. | 345/169 |

OTHER PUBLICATIONS

Misc. Akia Product Line Sales Brochure Materials (Undated).

*Primary Examiner*—Leo P. Picard
*Assistant Examiner*—John D. Reed
*Attorney, Agent, or Firm*—Konneker & Smith, P.C.

[57] ABSTRACT

A semi-mobile desktop personal computer incorporating the features of a desktop personal computer with the mobility of a mobile personal computer. The computer includes a system enclosure attached to a storage enclosure, the storage enclosure extends outside the system enclosure and provides stability for the system enclosure by engaging the surface on which the system enclosure has been placed for use.

15 Claims, 7 Drawing Sheets

SEMI-MOBILE DESKTOP PERSONAL COMPUTER

FIELD OF THE INVENTION

The present invention relates generally to personal computers and more particularly to desktop personal computers.

BACKGROUND OF THE INVENTION

As is well known to persons skilled in the art the desktop personal computer has a large form factor. The desktop personal computer includes components such as, a power supply, a microprocessor, memory, storage drives such as, hard disk drives and removable media drives, and logic for controlling standard peripherals such as, keyboards and mouse input devices.

The desktop personal computer also includes option card slots for one or more of the personal computer's standard option cards, such as, Peripheral Component Interconnect ("PCI"), Enhanced Industry Standard Architecture ("EISA"), and Industry Standard Architecture ("ISA") cards. The PCI, EISA and ISA option cards can be; for example, display(monitor) controller cards, memory controller cards, or hard disk drive controller cards. The desktop personal computer's power supply also requires a transformer and because the power supply has heat-generating parts, a fan can also be required.

Reconfiguring the desktop personal computer is not easy. Replacing, adding or removing a PCI, EISA, or ISA option card requires opening the desktop personal computer. It is also necessary to open the desktop personal computer to replace a defective component, such as a power supply or fan, or to remove, add or replace a storage drive.

The desktop personal computer can be required to be moved, for example; between offices, to a computer store for service or to a college dormitory. The desktop personal computer can not be easily moved because it is bulky, heavy and has a large form factor.

Another disadvantage of the desktop personal computer is its large footprint. The desktop personal computer's large footprint limits the workspaces on which the desktop personal computer can be used.

The personal computer's components have been miniaturized in order to provide lightweight, non-bulky, small form factor, mobile personal computers. Miniaturized components include the Personal Computer Memory Card International Association ("PCMCIA") option cards, also known as PC Cards and storage devices. Unlike standard desktop personal computer option cards such as, PCI, EISA and ISA option cards PC Cards are easily added, replaced or removed, without opening the mobile personal computer.

Although mobile personal computers have a smaller form factor, are lightweight and non-bulky and the option cards are easy to reconfigure, mobile computers lack some of the functionality of desktop personal computers, for example, mobile personal computers have a small number of option card slots. Also, because mobile personal computers can operate from a battery they are influenced by the requirement for low power consumption. To provide low power consumption, mobile personal computers use low speed components, such as memory and microprocessors. Therefore, mobile personal computers can have lower performance than desktop personal computers.

Mobile personal computers support standard personal computer peripherals such as, detached keyboards, mouse input devices and displays(monitors), but there is redundancy because mobile personal computers also have integrated peripherals such as keyboards, mouse input devices and displays.

Personal computer users requiring the functionality of a desktop personal computer and the mobility of a mobile personal computer require a mobile personal computer and a desktop personal computer. The disadvantages of requiring a mobile personal computer and a desktop personal computer include the cost of the personal computers and having to transfer data between the personal computers.

Therefore, what is required is an easily reconfigured semi-mobile desktop personal computer, with the small form factor, small footprint, lightweight, non-bulky features of a mobile personal computer and the functionality of a desktop personal computer.

SUMMARY OF THE INVENTION

An object of this invention is a lightweight, small form factor, non-bulky semi-mobile desktop personal computer.

Another object of this invention is a small footprint semi-mobile desktop personal computer.

Still another object of this invention is an easily reconfigurable semi-mobile desktop personal computer.

Yet another object of this invention is a visually pleasing semi-mobile desktop personal computer.

These and other objects are attained by a semi-mobile desktop personal computer including an elongated thin system enclosure and a storage enclosure attached to the back wall of the system enclosure. The storage enclosure extends from the back wall outside the system enclosure and provides stability to the computer by engaging the surface on which the system enclosure is placed.

The instant invention provides a number of advantages. For example, the semi-mobile desktop personal computer is easy to move. The semi-mobile desktop personal computer can be easily reconfigured by replacing storage drives and option cards without having to remove any of the semi-mobile desktop personal computer's walls. The semi-mobile desktop personal computer's vertical orientation provides a small footprint and the small footprint optimizes limited workspace.

BRIEF DESCRIPTION OF THE DRAWINGS

The above and other features and advantages of the present invention will become apparent from a reading of the detailed description in conjunction with the attached drawings, in which like reference numerals refer to like elements in the several views.

DETAILED DESCRIPTION OF THE PREFERRED EMBODIMENT

Figure 1:
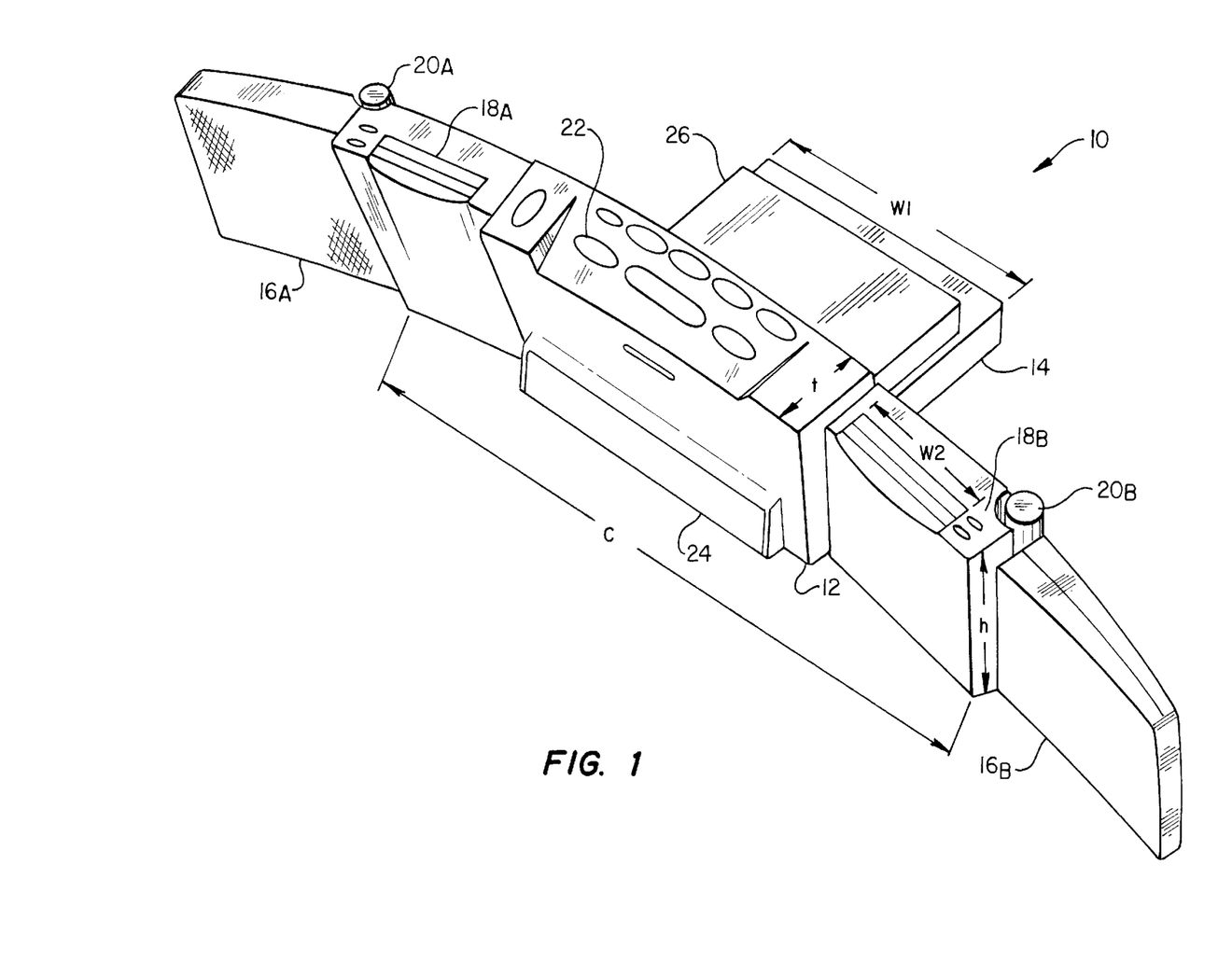
FIG. 1 is a perspective view showing the front of the semi-mobile desktop personal computer according to the principles of this invention.

Referring now to the drawings and particularly to FIG. 1 where there is shown a semi-mobile desktop personal computer 10, according to the principles of this invention. The semi-mobile desktop personal computer 10 in the embodiment shown in FIG. 1 includes a system enclosure 12, a storage enclosure 14 and a hard disk drive enclosure 26.

The system enclosure 12 includes components such as, a processor, memory, controllers for standard personal computer peripherals such as, displays and input devices, and option card slots 18. The system enclosure 12 does not include storage drives. The arrangement of the semi-mobile desktop personal computer's 10 components in the system enclosure's components provides an elongated thin system enclosure 12.

Figure 2:
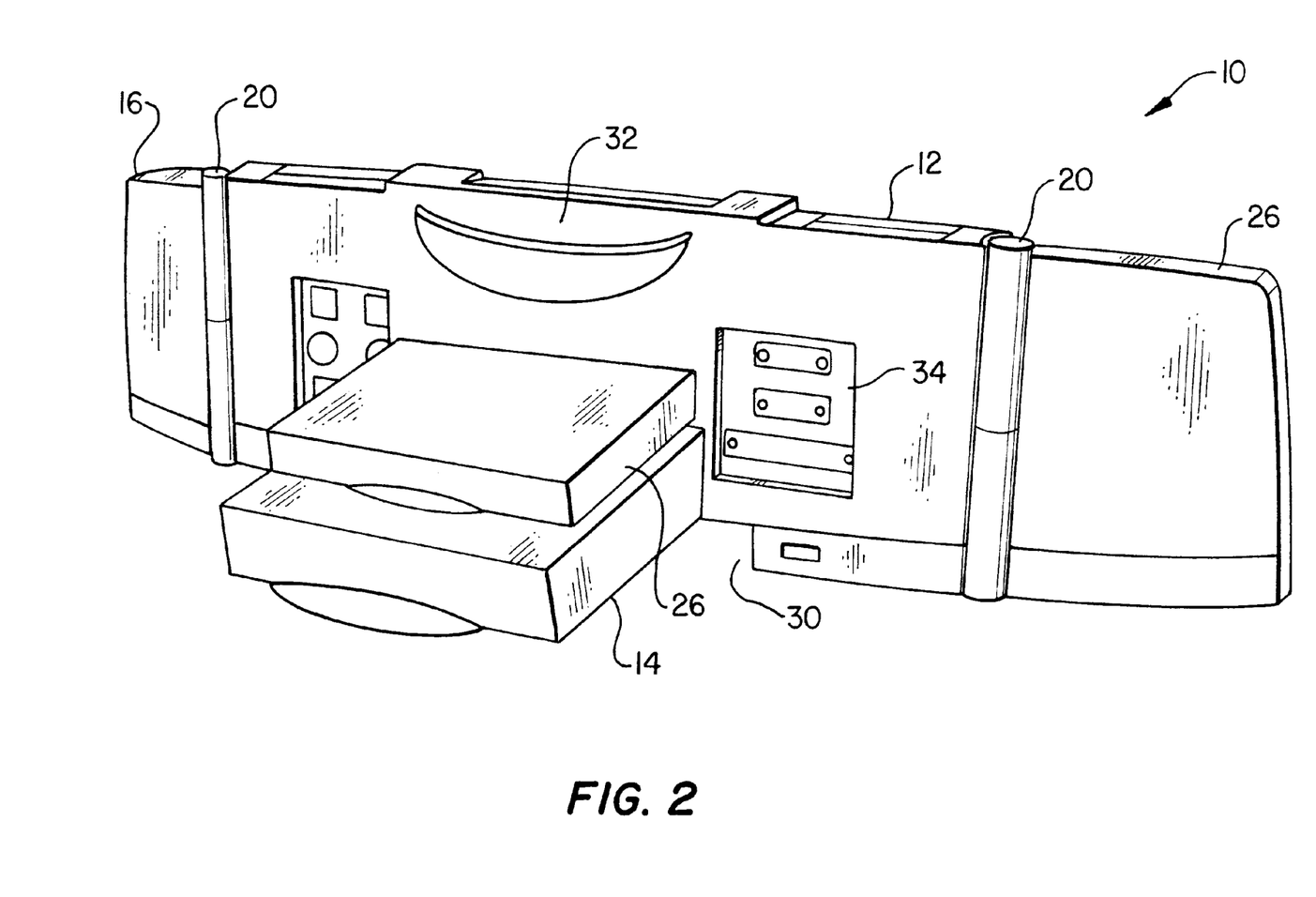
FIG. 2 is a perspective view showing the rear of the semi-mobile desktop personal computer shown in FIG. 1.
Figure 6:
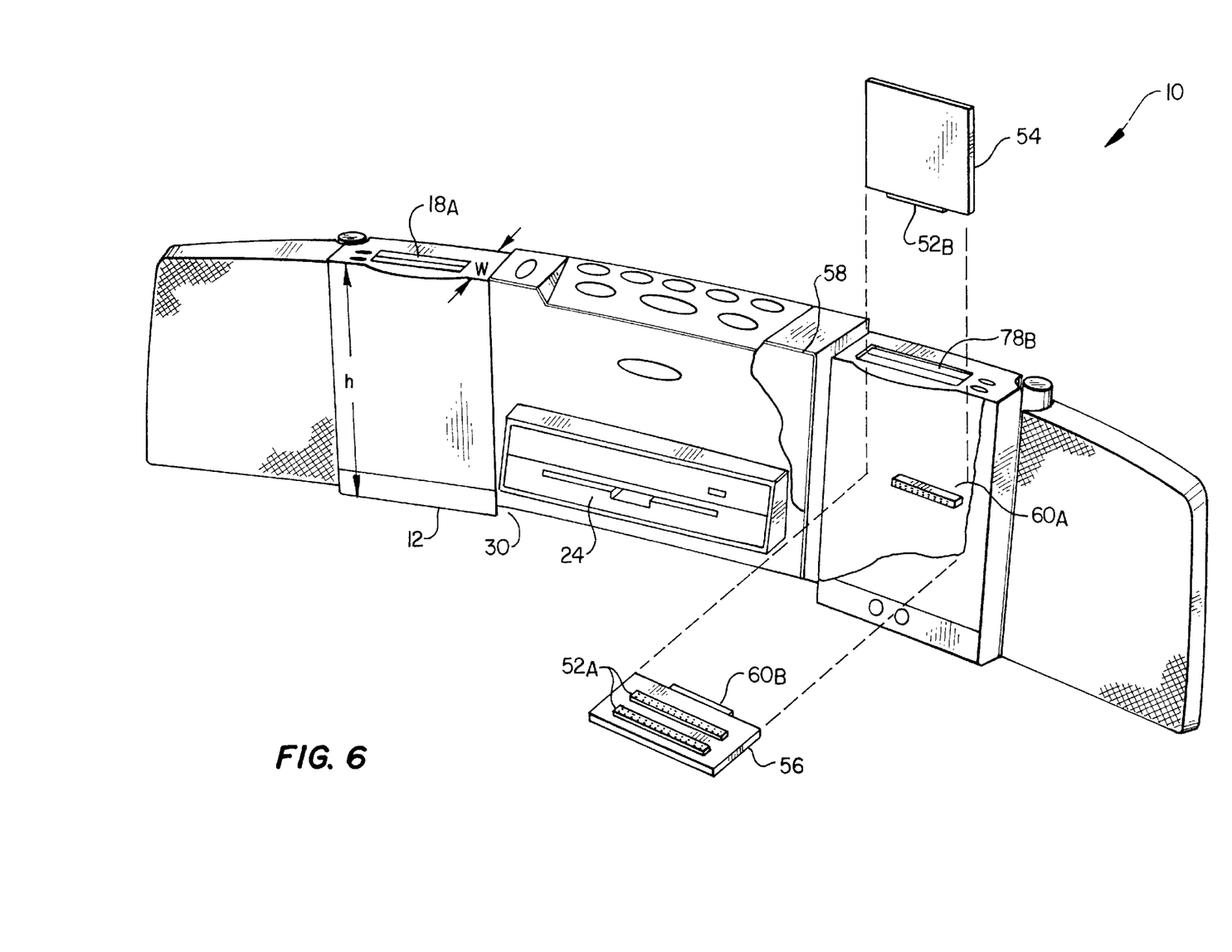
FIG. 6 is a perspective view of an embodiment for connecting PC Cards to the semi-mobile desktop personal computer.

As shown in FIG. 1 the length l of the system enclosure 12 is influenced by the width w1 of the storage enclosure 14 or the hard disk drive enclosure 26, and the width w2 of the option card slot 18. The height h of the system enclosure 12 is influenced by the height of the option cards that can be mounted in the system enclosure 12, for example, PC Cards 54, as shown in FIG. 6, and other components, such as external connectors 34, as shown in FIG. 2.

Figure 5:
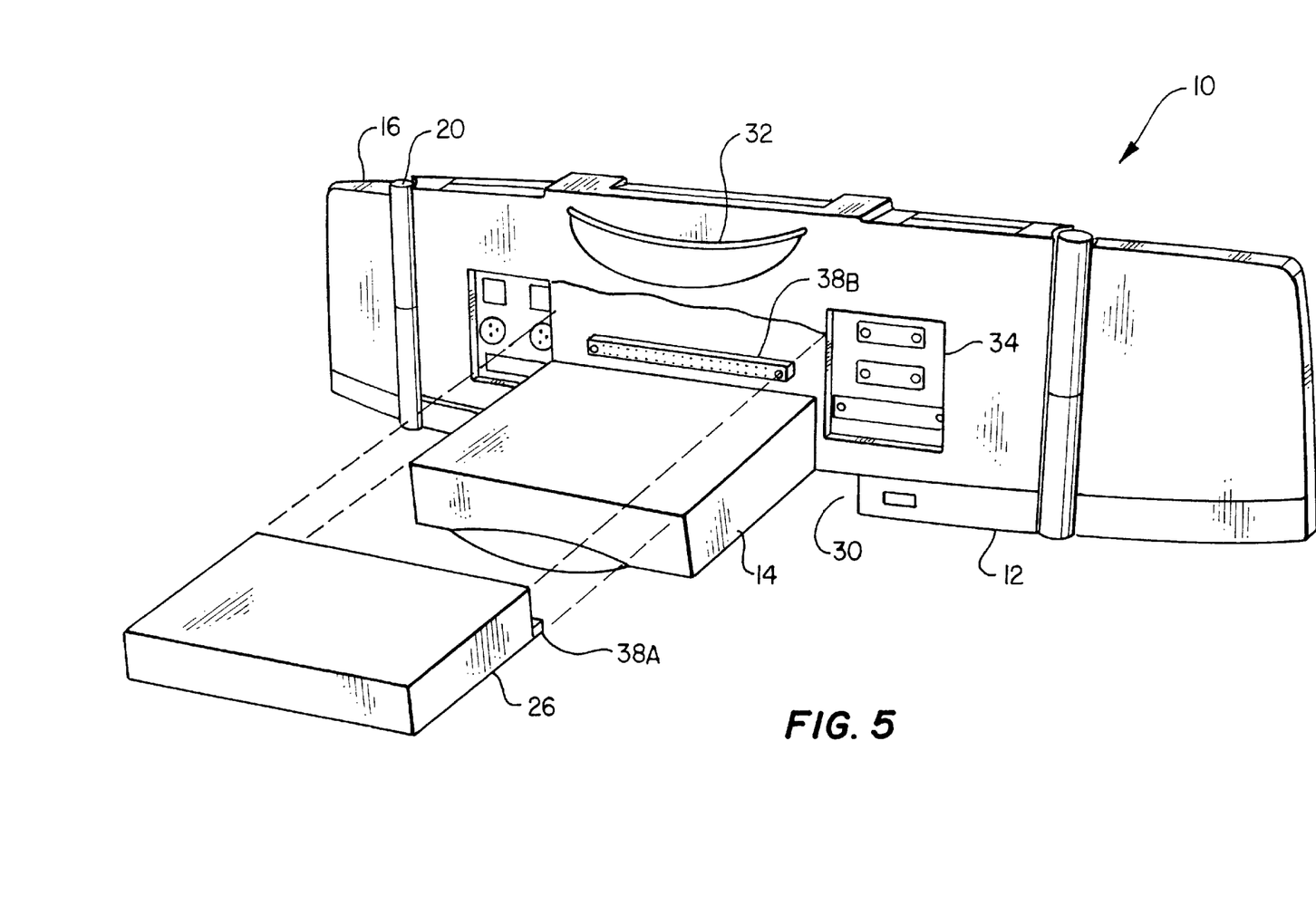
FIG. 5 is the exploded rear view of the semi-mobile desktop personal computer shown in FIG. 2 with a first storage enclosure in mounted position showing an embodiment for connecting a second storage enclosure to the semi-mobile desktop personal computer's system enclosure, where the second storage drive is a hard disk drive enclosure.

Referring again to FIG. 1 the thickness t of the top and bottom walls of the system enclosure 12 is influenced by the number of internal logic boards 58 as shown in FIG. 5 that can be mounted in the system enclosure 12. As shown in FIG. 1 the thickness t is also influenced by the number of option card slots 18 and the spacing between the option card slots 18, for example, the spacing between option card slots 18 for PC Cards is influenced by the type of PC Card inserted, for example, Type I, Type II or Type III PC Cards.

In the embodiment shown in FIG. 1 the system enclosure's 12 components are oriented such that the length l of the system enclosure is greater than its thickness t providing a thin elongated system enclosure 12. This results in a small footprint system enclosure 12 in which the ratio of its length, width and height is such that when the system enclosure's 12 bottom wall engages the surface on which it is placed for use, the system enclosure 12 can be unstable.

The storage enclosure 14 and the hard disk drive enclosure 26 are attached to the back wall of the system enclosure 12. The storage enclosure 14 provides stability to the semi-mobile desktop personal computer 10 by engaging the surface on which the semi-mobile desktop personal computer 10 is placed for use. In the embodiment shown the storage enclosure 14 is a hollow receptacle into which a removable media storage drive such as a 5¼" CDROM drive or a 5¼" floppy disk drive can be mounted. The hard disk drive enclosure 26 is located on top of the storage enclosure 14. The hard disk drive enclosure 26 can include, for example, a 3½" hard disk drive. In the embodiment shown the storage enclosure 14 including the removable media drive provides stability to the semi-mobile desktop personal computer 10. In other embodiments the hard disk drive enclosure 26 can provide stability to the semi-mobile desktop personal computer 10.

A media device insertion slot 24 can be provided on the front wall of the system enclosure 12, for inserting media in the removable media drive 28 mounted in the storage enclosure 14.

In the embodiment shown in FIG. 1 the front and back walls of the system enclosure 12 are curved, so as to provide a curvilinear shaped semi-mobile desktop personal computer 10. However, the semi-mobile desktop personal computer 10 is not limited to the curvilinear shape shown, the front and back walls of the system enclosure 12 can also be parallel to each other, so as to provide a rectangular semi-mobile desktop personal computer 10.

The system enclosure 12 can also include speakers 16. In the embodiment shown the speakers 16 are separate removable components connected by hinges 20, such as pivot hinges to the system enclosure 12. The hinges 20 allow the speakers 16 to be folded, for example, for ease in carrying the semi-mobile desktop personal computer 10 or to decrease the semi-mobile desktop personal computer's 10 footprint.

The semi-mobile desktop personal computer 10 can also include function buttons 22 as shown. The function buttons 22 are located on the top wall of the system enclosure 12, but they are not limited to the top wall. The function buttons 22 can be programmed to allow a user to access computer functions such as, printing documents, checking email messages and or accessing a world wide web page when the function button 22 for the computer function is hit.

The system enclosure 12 has a cable opening 30 located under the media drive insertion slot 24. Cables from peripheral devices, for example, keyboards can be inserted through the cable opening 30 for connecting to the external connectors 34 on the back wall of the system unit 12.

Referring now to FIG. 2, as shown the embodiment has a handle 32 located on or about the horizontal center of the rear wall of the system enclosure 12. The sculptured recessed pocket integral handle 32 provides a method for carrying the semi-mobile desktop personal computer 10, the location of the integral handle 32 is not limited to the horizontal center of the rear wall of the system enclosure 12.

The ability to add standard peripherals such as, monitors, modems, printers and keyboards and to provide power to the semi-mobile desktop personal computer 10 from an external power supply is provided through the external connectors 34 on the back wall of the system enclosure 12. The storage enclosure 14 and the hard disk drive enclosure 26 are shown extending from the back wall of the system enclosure 12. As shown, the storage enclosure 14 engages the surface on which the system enclosure 12 is placed for use.

Figure 3:
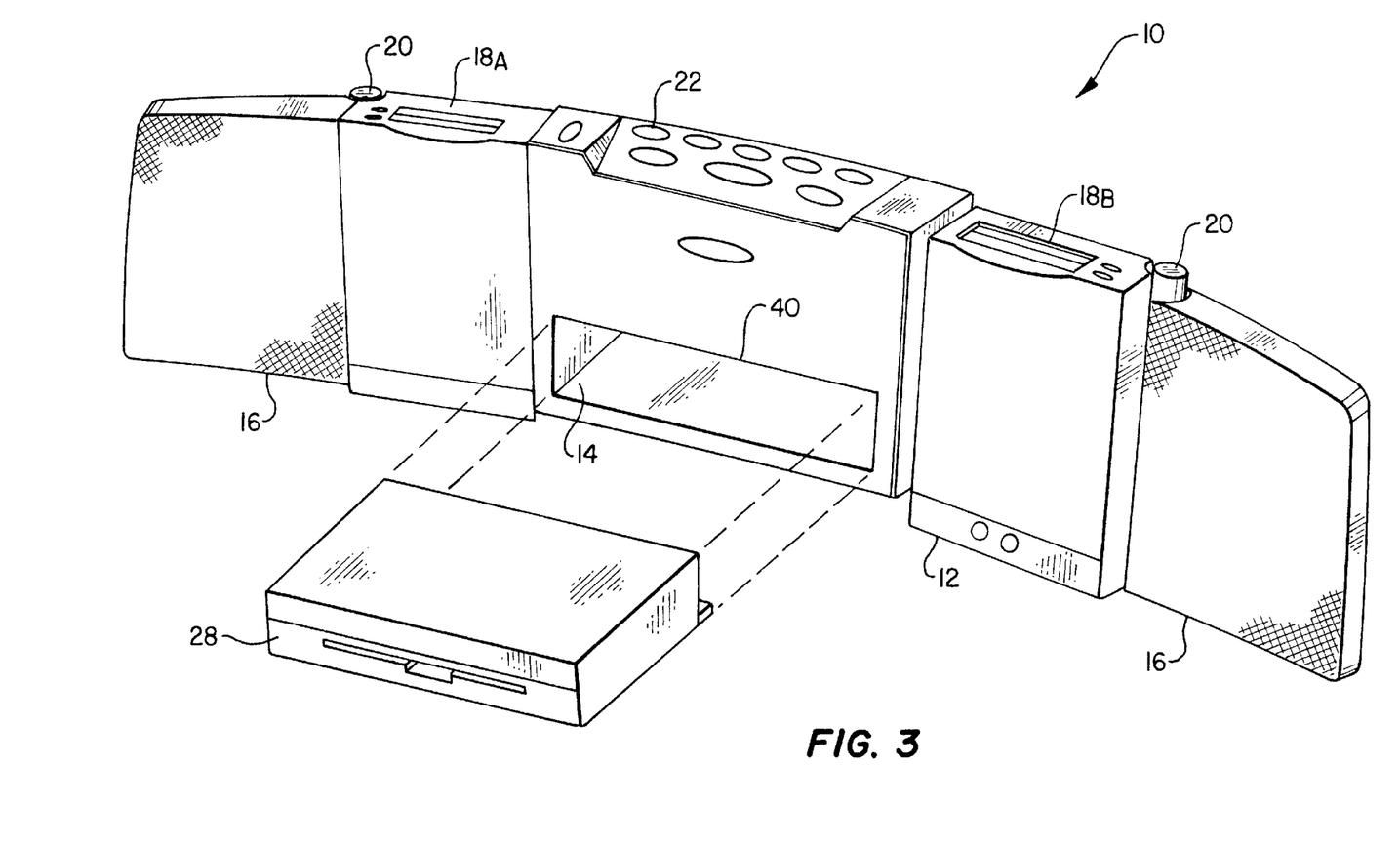
FIG. 3 is the exploded front view of the semi-mobile desktop personal computer shown in FIG. 1 showing an embodiment for connecting a removable storage drive to the semi-mobile desktop personal computer's system enclosure.
Figure 3A:
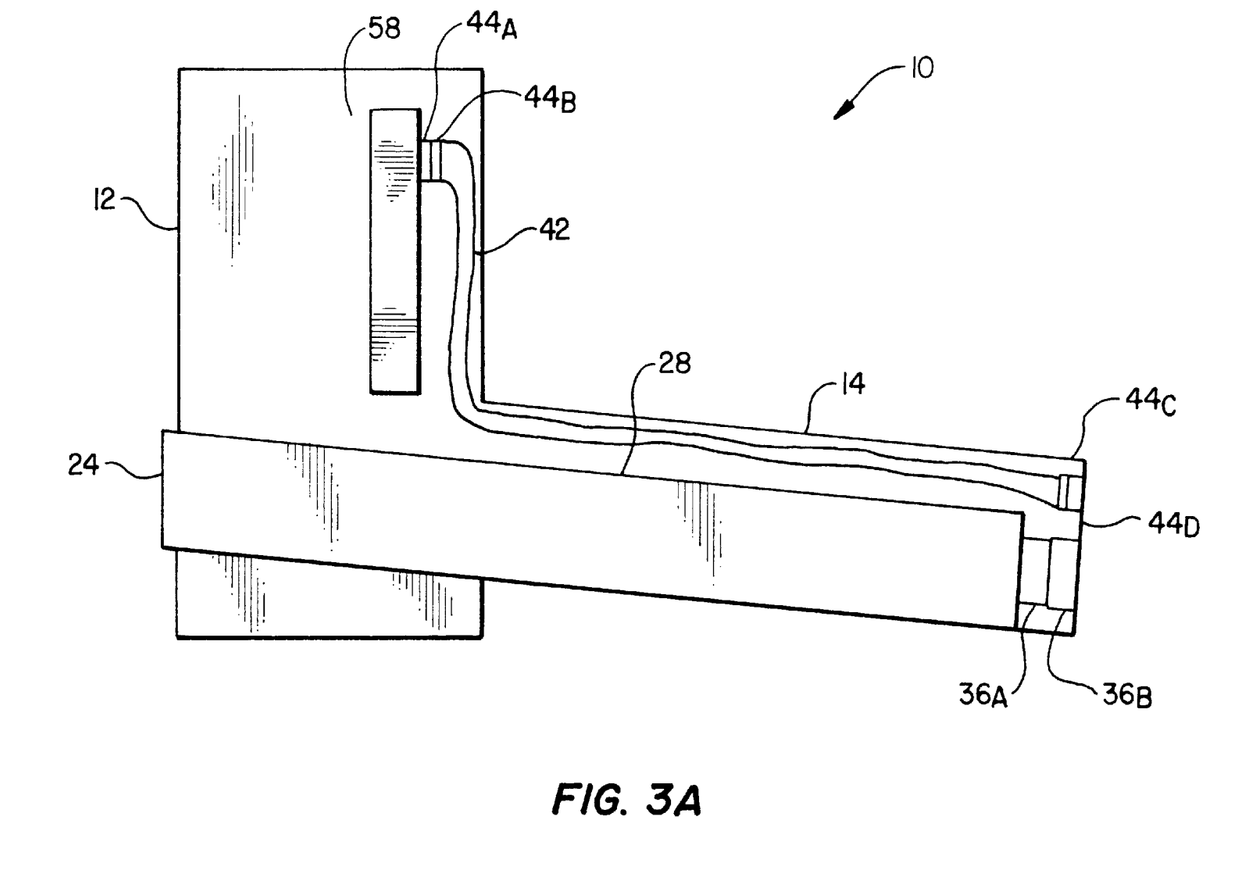
FIG. 3A is the side view of the exploded front view shown in FIG. 3 showing the removable storage drive in mounted position in a storage enclosure attached to the back wall of the semi-mobile desktop personal computer.

FIG. 3 and FIG. 3A show an embodiment for mounting a removable media drive 28 in the storage enclosure 14. As shown in FIG. 3 the front wall of the system enclosure 12 has a removable media drive opening 40 for inserting the removable media drive 28 into the storage enclosure 14. FIG. 3A shows the removable media drive 28 in mounted position in the storage enclosure 14. The storage enclosure 14 is attached to rear wall of the system enclosure 12 by connecting the top and bottom walls of the storage enclosure 14 to the rear wall of the system enclosure 12. The system enclosure 12 and the storage enclosure 14 can be integral or can be separate enclosures.

The storage enclosure 14 includes a removable media drive cable connector 44D and a removable media drive connector 36B, for providing control signals and power signals to the removable media drive 28. The removable media drive cable connector 44D and the removable media drive connector 36D are connected together, for example through etching in the storage enclosure 14.

A removable media drive cable 42 is provided, the removable media drive cable 42 includes a removable media drive cable connector 44B located at one end of the cable and a removable media drive cable connector 44C, located at the other end. Removable media drive cable connector 44B is connected to removable media drive cable connector 44A located on the logic board 58 and removable media drive cable connector 44C is connected to removable media drive cable connector 44D located inside the storage enclosure 14.

The removable media drive 28 includes a removable media drive connector 36A on one end of the removable media drive 28. The removable media drive 28 is inserted into the removable media drive opening 40 until the removable media drive connector 36A is connected to the removable media drive connector 36B. With removable media drive connector 36A connected to removable media drive connector 36B, the removable media drive 28 is mounted in storage enclosure 14 and the control and power signals from the removable media drive 28 are connected to the control and power signals on the logic board 58.

Figure 4:
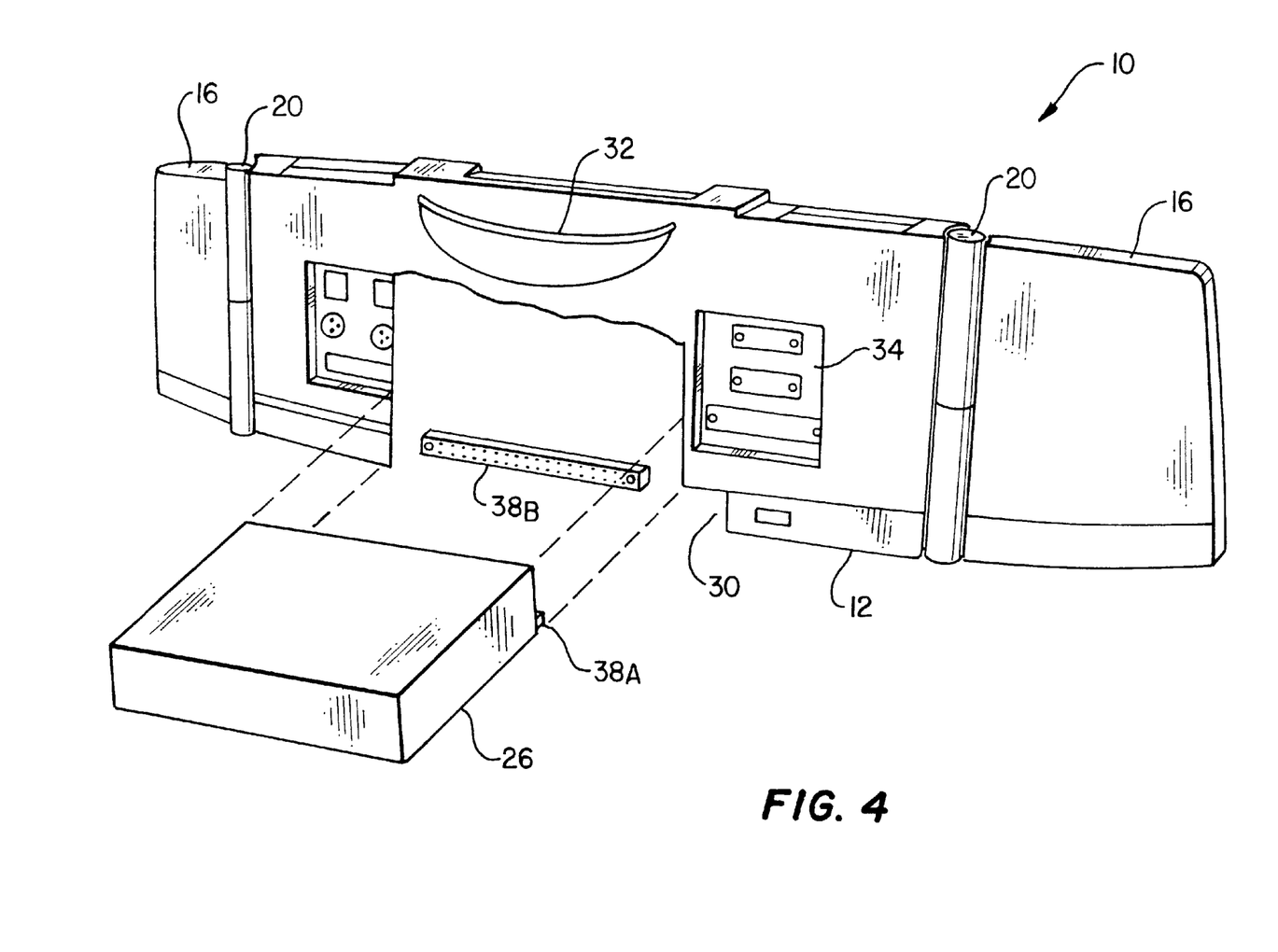
FIG. 4 is the exploded rear view of the semi-mobile desktop personal computer shown in FIG. 2 showing an embodiment for connecting a hard disk drive enclosure to the semi-mobile desktop personal computer's system enclosure.

As shown in FIG. 4 the storage enclosure 14 providing stability to the system enclosure 12 can be a hard disk drive enclosure 26. The hard disk drive enclosure 26 includes a hard disk drive connector 38A and a hard disk drive. The hard disk drive connector 38B is mounted on the rear wall of the system enclosure 12. The hard disk drive enclosure 26 is fastened to the back wall of the system enclosure 12 when hard disk drive connector 38A and hard disk drive connector 38B are connected.

FIG. 5 shows the storage enclosure 14 attached to the system enclosure 12 and providing stability to the system enclosure 12 by engaging the surface on which the system enclosure 12 is placed for use. In the embodiment shown a hard disk drive enclosure 26 can be connected to the system enclosure 12. When mounted, the hard disk drive enclosure's 26 bottom surface rests on the top surface of the storage enclosure 14 as shown in FIG. 1. Referring to FIG. 5 the system enclosure 12 includes a hard disk drive connector 38A located on the rear wall. The hard disk drive connector 38A provides electrical signals to the hard disk drive enclosure 26.

A hard disk drive connector 38B is also located on the hard disk drive enclosure 26. The hard disk drive enclosure 26 is connected to the system enclosure 12 by connecting hard disk drive connector 38A and hard disk drive connector 38B. The semi-mobile desktop personal computer 10 can be easily reconfigured by replacing the removable media drives in the storage enclosure 14 and the hard disk drive enclosure 28 without opening the system enclosure 12.

FIG. 6 shows an embodiment for connecting a PC Card 54 to the semi-mobile desktop personal computer 10 through option card slots 18 located on the top wall of the system enclosure 12. The PC Card 54 is the type of option card shown in the embodiment in FIG. 5, but it other types of option cards with similar features to the PC Card 58 can also be used.

As shown, the semi-mobile desktop personal computer 10 includes a logic board 58 mounted vertically inside the system enclosure 12. The logic board 58 includes electronic components such as, a microprocessor and device control logic. The logic board 58 also includes a PC Card motherboard connector 60A. In the embodiment shown in FIG. 5 the logic board 58 includes two PC Card motherboard connectors 60A, one for option card slots 18A and one for option card slots 18B. However, other embodiments may have more or less PC Card motherboard connectors 60A.

The semi-mobile desktop personal computer 10 also includes a PC Card motherboard 56 for each set of option card slots 18. The PC Card motherboard 56 includes at least one PC Card connector 52A mounted on the top surface of the PC Card motherboard 56. The PC Card motherboard 56 also includes a PC Card motherboard connector 60B mounted on the edge of the PC Card motherboard 56 facing the PC Card motherboard connector 60A on the logic board 58. In the embodiment shown in FIG. 5, the PC Card motherboard 56 includes two parallel spaced apart PC Card connectors 52A mounted on the PC Card motherboard 56. However, other embodiments may have more or less PC Card connectors 52A.

The PC Card motherboard 56 is connected to the logic board 58 by connecting the PC Card connector 60B mounted on the PC Card motherboard 56 to the PC card connector 60A mounted on the logic board 58. When the PC Card connectors 60 are connected the PC Card motherboard 56 and the logic board 58 are perpendicular to each other.

The PC Card 54 includes a PC Card connector 60B mounted at one end of the PC Card 54. As shown in FIG. 5, the PC Card 54 is orientated so that the side of the PC Card 54 on which the PC Card connector 60A is mounted is at the lower end of the PC Card 54. The PC Card 54 is inserted in a direction parallel to the logic board 58 through an option card slot 18 located on the top wall of the semi-mobile desktop personal computer 10 until the PC Card connector 60B on the PC Card 54 is connected to the PC Card connector 60A on the PC Card motherboard 56. In the embodiment shown one Type III PC Card or two Type II PC Cards can be inserted in the option card slots 18. The semi-mobile desktop personal computer 10 can be easily reconfigured by adding, removing or replacing a PC Card 54 in a option card slot 18, without having to open the system enclosure 12.

Having described the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A computer enclosure comprising:
   a storage enclosure for holding a drive; and
   an elongated thin system enclosure comprising
      spaced apart front and back walls;
      side walls connecting the front and back walls, the side walls being of smaller horizontal extent than the front and back walls;
      a top; and
      a bottom, the top and bottom connecting the front, back and side walls, the storage enclosure fastened to the back wall and extending from the back wall outside the system enclosure to provide stability to the computer enclosure by engaging the surface on which the computer enclosure is placed for use.

2. A computer enclosure as claimed in claim 1 wherein the storage enclosure and system enclosure are integral.

3. A computer enclosure as claimed in claim 1 wherein the system enclosure has a curvilinear shape.

4. A computer enclosure as claimed in claim 1 wherein the system enclosure has a rectangular shape.

5. A computer enclosure as claimed in claim 1 wherein the system enclosure has an opening in the front wall for inserting a removable media drive for mounting in the storage enclosure.

6. A computer enclosure as claimed in claim 1 wherein the storage enclosure is a hard disk drive enclosure.

7. A computer enclosure as claimed in claim 1 further comprising:

another storage enclosure, the other storage enclosure located on top of the storage enclosure, the bottom wall of the other storage enclosure resting on the top wall of the storage enclosure and the other storage enclosure attached to the back wall of the system enclosure and extending outside the system enclosure.

8. A computer enclosure as claimed in claim 1 further comprising:

vertically orientated option cards on both sides of the storage enclosure.

9. A computer enclosure as claimed in claim 5 wherein the option cards are PC Cards.

10. A computer enclosure as claimed in claim 1 further comprising:

a handle connected to the system enclosure.

11. A computer enclosure as claimed in claim 8 wherein the handle is a sculptured recessed pocket integral handle.

12. A computer enclosure as claimed in claim 1 further comprising:

speakers attached to the side walls of the system enclosure.

13. A computer enclosure as claimed in claim 11 wherein the speakers are attached by the use of pivot hinges.

14. A computer enclosure as claimed in claim 13 wherein the speakers are foldable.

15. A computer enclosure as claimed in claims 12, 13 or 14 wherein the speakers are removable.

* * * * *